L. W. BARBER.
CENTER BEARING FOR CARS.
APPLICATION FILED MAR. 7, 1905.
909,518.
Patented Jan. 12, 1909.
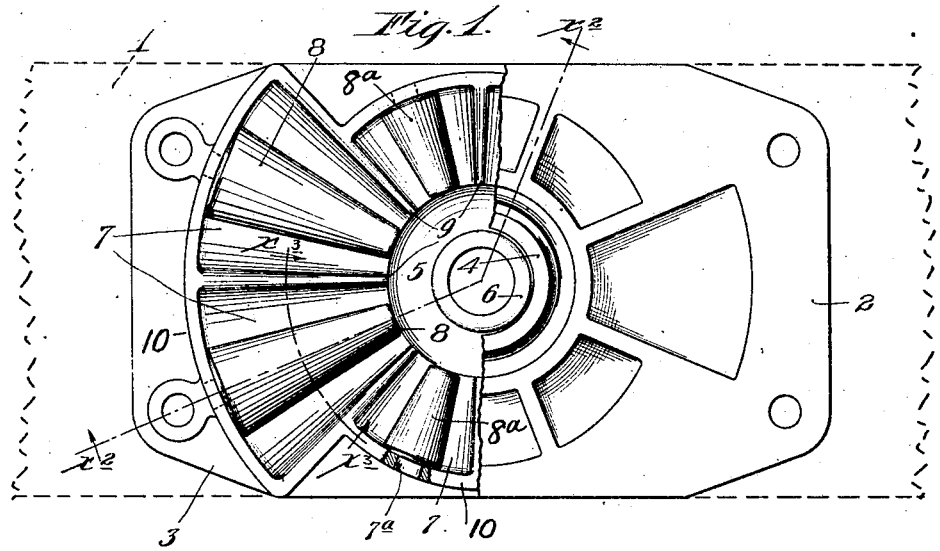
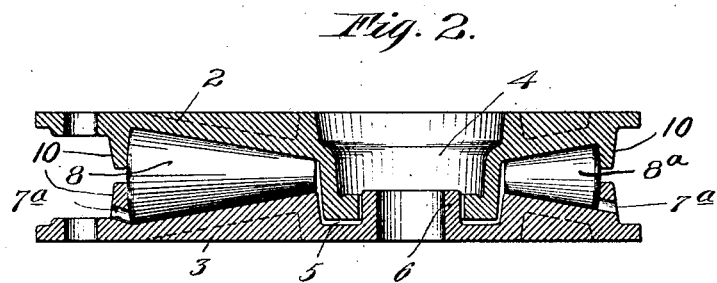
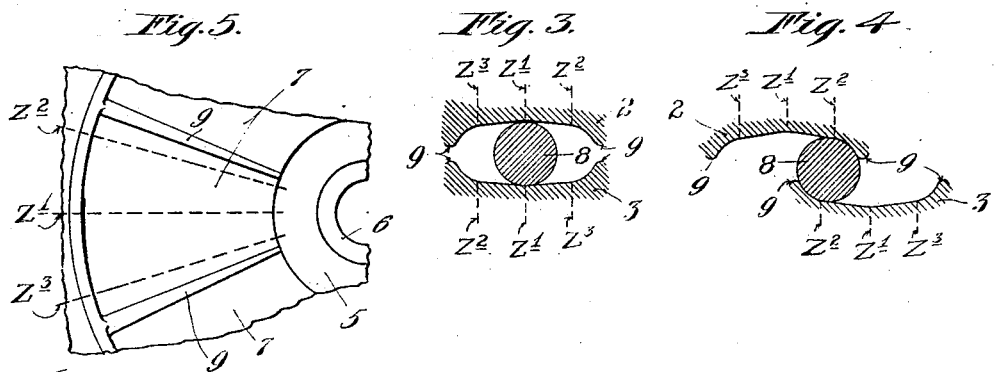
Witnesses.
E. W. Jeppesen.
A. H. Opsahl.
Inventor:
Lee W. Barber.
By His Attorneys
Williamson & Merchant

UNITED STATES PATENT OFFICE.

LEE W. BARBER, OF CHICAGO, ILLINOIS.

CENTER-BEARING FOR CARS.

No. 909,518.  Specification of Letters Patent.  Patented Jan. 12, 1909.

Application filed March 7, 1905. Serial No. 243,862.

*To all whom it may concern:*

Be it known that I, LEE W. BARBER, citizen of the United States, residing at Chicago, in the county of Cook and State of Illinois, have invented certain new and useful Improvements in Center-Bearings for Cars; and I do hereby declare the following to be a full, clear, and exact description of the invention, such as will enable others skilled in the art to which it appertains to make and use the same.

My invention has for its object to provide an improved roller bearing center plate for cars, and other similar uses; and to this end, my invention consists of the novel devices and combinations of devices hereinafter described and defined in the claim.

The invention is illustrated in the accompanying drawings, wherein like notations refer to like parts throughout the several views.

In said drawings: Figure 1 is a plan view, with some parts broken away, showing the two plates as related to each other and to the underlying truck bolster. Fig. 2 is a vertical section through the two plates, detached, on the irregular line $x^2$ $x^2$ of Fig. 1. Fig. 3 is a vertical section, taken on the curved line $x^3$ $x^3$ of Fig. 1, some parts being broken away. Fig. 4 is a view similar to Fig. 3, but with the plates and roller shown as they appear when the two plates have received angular motion relative to each other to their limit; and Fig. 5 is a diagram view illustrating one of the roller seats.

In Fig. 1, the truck bolster 1 is represented in dotted lines.

The numerals 2 and 3 represent, respectively, the upper and the lower members of the two plates. These two plates have telescoping hubs, the hub of the upper plate being marked 4, and that of the lower marked 6, and the latter is provided with the customary passage for king pin, not shown. Between the two plates 2 and 3 are located a series of conical rollers, some of which are long and others of which are short, the long rollers being marked 8 and the short rollers $8^a$. The said rollers are radially disposed between the two plates, with their large ends outward and abutting against the thrust flanges 10 of the two plates. The said rollers work in seats 7 formed on the respective plates 2 and 3; and the bearing surfaces of these seats are radially conformed to the conical shape of the rollers so as to bear on the rollers for their full length. The said seats are also so formed as to afford radial stop ribs 9 which engage with opposite sides of the interposed rollers to determine and limit the angular motion or throw of the two plates, in respect to each other, in a way which may be readily understood from an inspection of Fig. 4. The bearing surfaces of these seats 7, on the two plates, are not concave in cross section, except in the portions thereof adjacent to the stop ribs 9, but are flat and inclined in opposite directions from their median lines or central position of the interposed rollers, as clearly shown in Figs. 3 and 4.

When the rollers are in their normal position, or the position which they would occupy when the car is running on a straight track, the parts will be related as shown in Figs. 1 and 3. The line Z $Z^1$, on Fig. 3, indicates this central position and the plane of the radial line from which the inclined bearing surfaces of the seats 7 diverge. The lines marked, respectively, $Z^2$ and $Z^3$, in Figs. 3 and 4, indicate the limits of the inclined flat bearing surfaces for the rollers. Otherwise stated, the inclined bearing surfaces for said rollers, measured on the arc of a circle, extend in opposite directions from $Z^1$ to $Z^2$ and $Z^3$, respectively. The portions of the seats between the lines $Z^2$ and $Z^3$, respectively, and the respective stop ribs 9, are concave in cross section at all points and struck on substantially the same arc as the peripheries of the rollers. The roller seats 7, taken as a whole, are of considerably greater cross section, measured on the arc of the rollers' travel, than the peripheries of the rollers, so as to permit the necessary travel of the rollers to secure the desired angular throw of the two plates in respect to each other. It is obvious that with the rollers and their seats constructed as described, the rollers will travel up the inclined surfaces of the seats under the angular throw of the two plates, thus causing the plates to be slightly separated, or the upper plate lifted in respect to the lower plate, and causing the load to return the parts to their normal position, by gravity, as soon as the car again comes onto a straight section of track. At either limit of the angular throw of the two plates, the rollers will be engaged by the opposite stop ribs 9, thereby determining the extent of this motion, as hitherto noted. This engagement of the stop ribs 9 with the opposite faces of the rollers will also have the effect of realining the rollers in their proper radial positions lengthwise of their seats.

The outer ends of the rollers are rounded, and the bearing faces of the thrust flange 10, against which the outer ends of the rollers abut, are struck on such arcs that they conform to the ends of the rollers and permit the rollers to bear against the same full width, both in the horizontal and vertical directions. The object is to get the largest possible surface on the flanges 10 to take the thrust from the rollers. The parts are so proportioned that the rollers support the upper plate 2 from the lower plate 3, with a little clearance under the hub 4 of the upper plate in the depression 5 of the lower plate 3, as shown in Fig. 2.

The long rollers 8 extend in the general direction of the truck bolsters, while the short rollers 8ª are located between the two sets of long rollers, or so that their general direction is lengthwise of the car. This arrangement of the long and the short rollers greatly increases the bearing surface transversely of the truck; and, hence, better adapts the center bearing to support the car body against lateral rocking movement.

The lower member of the thrust flanges 10 is shown as provided with small openings 7ª through which the dust and dirt from the roller seat may escape.

What I claim is:—

The combination with upper and lower members of a center bearing both of which have radially disposed circumferentially spaced roller seats, certain of said seats, at diametrically opposite points, being relatively long as compared with the other seats, and conical rollers interposed between the seats of said members, those engaged with the long seats being relatively long as compared with those that engage with said short seats, substantially as described.

In testimony whereof I affix my signature in presence of two witnesses.

LEE W. BARBER.

Witnesses:
L. W. BARBER,
A. M. LOVE.